Patented Apr. 25, 1939

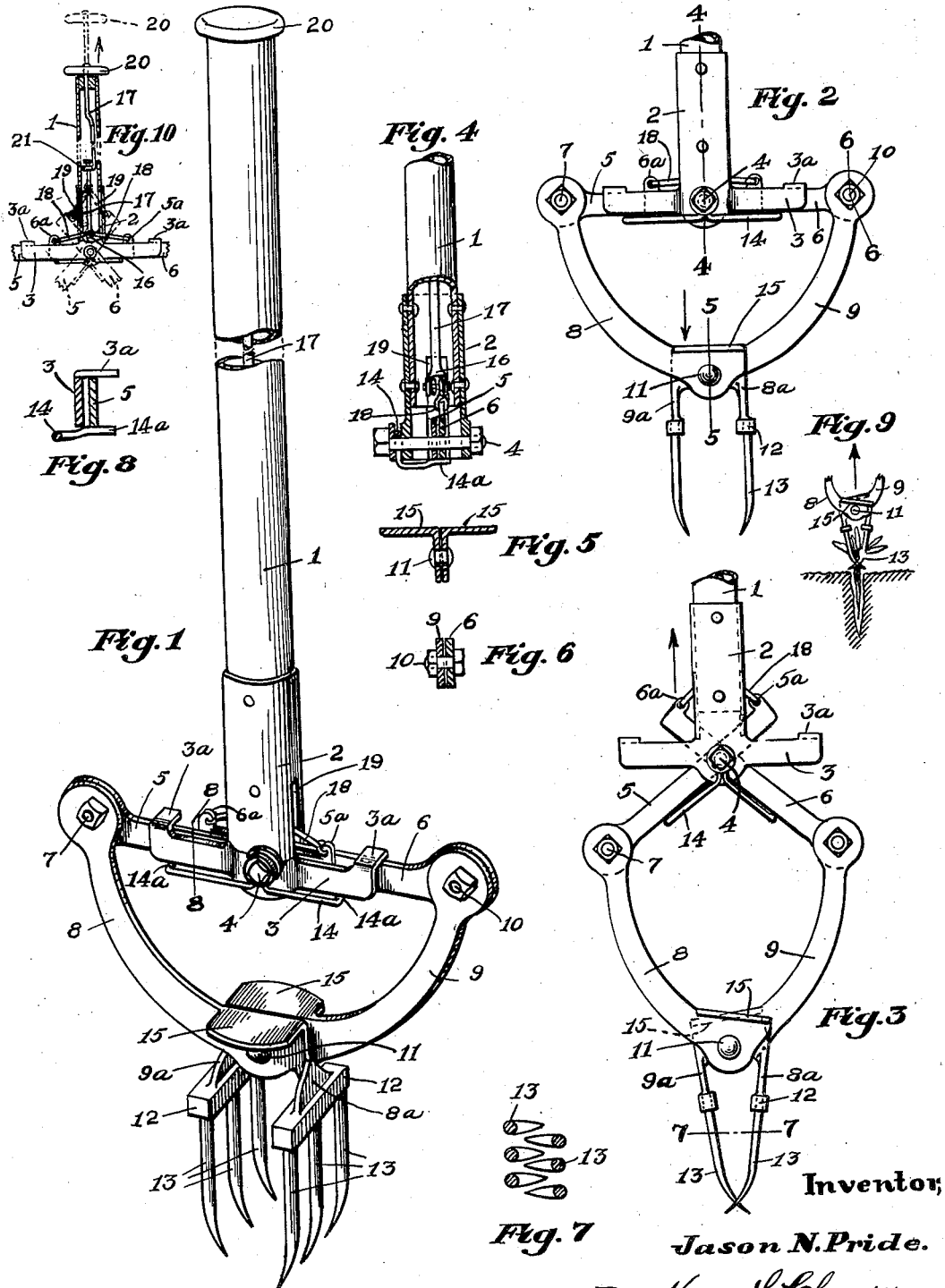

2,155,839

UNITED STATES PATENT OFFICE 2,155,839

WEED-PULLING APPLIANCE

Jason N. Pride, Windham Center, Maine, assignor, by direct and mesne assignments, of one-half to Henry L. Chenery, and one-fourth to James A. Taylor, both of Portland, Maine Application February 21, 1938, Serial No. 191,628

5 Claims. (Cl. 55—148)

This invention relates to an appliance especially constructed for use in removing various kinds of noxious weeds and growths from lawns and equally applicable for garden work where the extraction of undesirable plant life from the ground is to be undertaken.

A service for which the present invention is particularly useful is in connection with the work of clearing a lawn of dandelions, the device being capable of pulling not only the body but the whole length of the root as well, of these plants.

In many instances the removal of this plant from a lawn is done by the expedient method of cutting the root a short distance from the surface of the ground, leaving a portion of the root to develop into another plant which subsequently must be removed.

The invention, briefly stated, embodies a tongs, or pincher-like element, from each short arm or leg portion of which depend a plurality of pointed, inwardly-bent-end prongs or tines, the tines on one leg of the tongs being arranged in staggered relation to the tines on the other leg.

Interconnecting the ends of the long arms of the tongs is a toggle mechanism which, when upward pressure is placed on a handle by which the device is manipulated, acts to swing the two sets of tines together until they strongly engage the root or body of the plant being extracted from the ground. A spring serves to bring the toggle bars back into normal positions after the operation of pulling a weed is completed.

Usually the soil on a lawn is more or less hard and compact, in which case hand manipulation of the device may be supplemented by application of foot pressure, foot-engaging pads being provided for the latter purpose.

A feature of the device which is of great advantage in extracting weeds from the ground resides in the shape of the lower ends of the tines. They are pointed, so as to easily enter the soil and be forced downwardly the proper distance, but they are bent inwardly at their pointed ends in order that as they move downwardly they also move inwardly, loosening the ground around the root of the weed and approaching the latter from opposite sides.

Thus when upward tension is placed on the toggle mechanism the tines move further toward the root, encompassing but not cutting it. Should the root be of quite large diameter the tines grab is like two hooks; if very small, the root will be lodged between the tines as they interlock, and if by any chance the tines slide upwardly on the root without firmly gripping it, they will eventually engage the body of the weed which, together with, in most cases, the full length of the root, will be completely removed from the ground.

I have illustrated by invention in the accompanying drawing in which a preferred embodiment thereof is depicted.

In the drawing, in which like reference characters are employed to identify like parts in all the different views thereof, Fig. 1 is a perspective view of my weed-pulling appliance;

Fig. 2 is a side elevation thereof showing the parts in their normal, out-of-service positions;

Fig. 3 is the same as Fig. 2 except that the parts are shown as they appear when gripping the root of a weed;

Fig. 4 is a section on line 4—4, Fig. 2;
Fig. 5 is a section on line 5—5, Fig. 2;
Fig. 6 is a section on line 6—6, Fig. 2;
Fig. 7 is a section on line 7—7, Fig. 2;
Fig. 8 is a section on broken line 8—8, Fig. 1, and Fig. 9 shows the application of the appliance.
Fig. 10 is a fragmentary detail illustrating the operation of the toggle mechanism when hand-actuated.

Referring to the drawing, 1 is the handle by means of which the weed-pulling appliance is manipulated.

The lower end of the handle is secured in the sleeve 2 which preferably is made integral with the transversely disposed toggle-aligning beam 3.

Rotatively mounted on the bolt 4, within the slotted lower end of the handle sleeve, are two toggle-bars 5 and 6, and pivotally connecting the outer ends, respectively, of the toggle-bars are two elements which collectively will hereinafter be designated as a tongs.

The tongs include two long arms 8 and 9 and two short legs 8a and 9a, the toggle-bar 5 making pivotal connection, at 7, with the arm 8, and the toggle-bar 6 likewise joined to the arm 9, at 10.

The arms 8 and 9 are mutually and rotatively connected, one abreast of the other, on the rivet 11, and the short leg portions 8a and 9a of the structure each have a plurality of pointed prongs or tines 13 depending therefrom.

It will be observed that the tines are bent inwardly at their pointed ends, and that the set on one head 12 are staggered with respect to the set of tines on the other head, as is shown in Fig. 7; also, that when the tines on the two heads are in their weed-gripping positions they interlock, or overlap, so that when embracing a root or the body of a weed they provide against displacement of the weed from out of their grasp to a greater extent than if they were made straight. This feature embodying inwardly curved tine ends is very important, particularly when weeds with long and strong roots are to be extracted, for instance, plants like dandelions.

On each outer end of the toggle-aligning beam 3 is an abutment flange 3a, the two toggle bars 5 and 6, respectively, engaging these members 3a which serve as stops to locate the toggle members in relative alignment when in their normal positions, as shown in Figs. 1 and 2.

The toggle bars are yieldingly held against the stop members 3a by any one of various spring structures, but as shown, there is provided a length of spring wire looped midway its length around the bolt 4, this wire, 14, being abruptly bent at each end and extending transversely under each of the respective toggle bars, as shown in Figs. 1, 4 and 8, at 14a.

On each arm of the tongs is a foot-pad 15 which serves as means for the operator of the appliance to use foot power in forcing the prongs or tines into the ground when hard and firm, in addition to that which he may exert on the handle, by hand pressure.

In Fig. 2 the parts are shown ready for service in weed-pulling. As the tines are driven into the ground the more or less inwardly inclined surfaces of their lower ends acts to thrust them toward each other, that is, one set of tines toward the other set. Now by an upward pull on the handle 1 the abutment or stop elements 3a are raised, out of contact with the toggle bars 5 and 6, and as the latter members are pivotally mounted on the bolt 4 they are brought into inclined positions, as shown in Fig. 3, with the result that the upper ends of the arms 8 and 9 are swung toward each other.

But this action also causes the two sets of tines 13 in the short legs 8a and 9a, respectively, to move toward each other, and in certain instances to overlap, as shown in Fig. 3 and in sectional view in Fig. 7.

In this instance the lower ends of one set of tines are disposed, respectively, in the spaces between the tines in the other set, there being sufficient space allowed between adjacent tines when the two sets are in overlapping positions to admit the smaller size roots of weeds. In larger growths, such as dandelions, the prongs or tines might engage the dandelion roots on their extreme ends.

The inwardly bent ends of the tines serve a purpose other than that of procuring a firmer grip on the body or the root of a plant when the two sets come together.

By observation of Figs. 2 and 3 it will be apparent that the spring 14 acts, normally, to keep the elements 8a and 9a of the tongs apart, or open. Were the tines straight and the tension of the spring such as to hold the toggle members in their horizontally aligning positions, the tines could be sunk into the ground, and then pulled out, without result insofar as gripping the root of a weed is concerned.

But as an actual fact, the tines, as they are forced into the soil surrounding a weed, start moving toward each other, due to the fact that the convex contour of the ends of the tines presented to the ground as they are forced thereinto, particularly when the ground is dry and compact, causes the tines to move obliquely as they descend into the soil, thus slightly drawing them together.

But this inwardly directed movement of the ends of the two sets of tines lodges them under the soil immediately adjacent the root, so upon the start of upward movement of the handle to withdraw the tines there is a slight resistance to their withdrawal, sufficient to overcome the initial resistance of the spring 14 tending to hold the two sets of tines apart.

After the toggle-bars 5 and 6 start to assume their inclined positions, as seen in Fig. 3, the two sets of tines rapidly approach each other to closely bind the root in their embrace.

At this point, the greater the resistance offered by the weed to become detached from the ground the stronger will be the grasp of the tines of the tongs around its root.

The structure thus far described has particular reference to the weed-puller when operating directly over the weed with the handle of the puller standing erect, or in a substantially perpendicular position, so that the foot of the operator may be utilized in pressing the tines into the ground which, if it happens to be a lawn, is frequently firm and compact.

On certain occasions weeds and foreign growths are required to be extracted from the ground when found under bushes or other out-of-the-way places where it would be difficult to operate the device with it perpendicularly disposed.

I will now describe further structure incorporated in the device which enables one to use the puller in various inclined positions, shown in a somewhat reduced scale drawing in Fig. 10.

The parts to be described are utilized when the device is to be employed as an above-ground weed-grappling appliance and does not disqualify it or in any way interfere with its use for the purpose first set forth.

On the ends of the toggle-bars 5 and 6 are apertured lugs 5a and 6a, respectively, and connecting each of these lugs with the eye-bolt end 16 of the rod 17 is a link 18, these links extending into the hollow handle and sleeve, 1 and 2, through the side slots 19.

On the upper end of the rod 17 is a knob 20 which serves as means to partially withdraw the rod from the tubular handle 1 in order to actuate the toggle-bars and bring the two sets of tines into engagement, relatively.

In operating the device to grasp a weed above the ground one hand holds the handle 1 of the puller and the other hand actuates the rod by grasping the knob 20.

It will be observed that the rod 17 is made in two pieces, the upper part to which the knob 20 is attached, and the lower section which makes connection with the links 18.

Between the two parts of the rod is a slip-joint connection at 21. Thus when operating the puller in the manner first described and the toggle-bars are actuated by the resistance to withdrawal of the tines from the ground, the knob 20 is not forced upwardly from the end of the handle 1, as would otherwise be the case, the lower portion, in this instance, sliding upwardly over the upper part of the rod.

When it is desired to hand-actuate the toggle-bars, however, the loop on the upper rod portion engages the head on the lower rod portion and actuation of the toggle-bars and bringing together of the two sets of tines is accomplished by pulling outwardly on the knob 20.

My appliance saves much labor and effort on the part of those who have the care of gardens and lawns in their keeping, and the fulfillment of the object of the invention is effected without the back-breaking work of stooping as is required when weeds are to be removed from the ground by the conventional cutting method. Moreover, the obnoxious growths are more completely eradicated by complete removal from the earth than is usually the case when their removal is undertaken by a cutting process.

What I claim is:

1. A weed-pulling appliance comprising two rotatable members each having a long arm and a short leg, a rivet pivotally securing the two said members together, a plurality of tines, having pointed lower ends bent inwardly, disposed on and depending from each of said short legs, the tines in each leg being arranged in a row parallel with the axis of said rivet, toggle bars pivotally connected at their outer ends to the free ends, respectively, of the two long arms of said rotatable members, a toggle-bar-aligning member to which the inner ends of said toggle bars are pivotally connected, a stop element at each end of said toggle-bar-aligning member, adapted to limit the rotative movement of said toggle bars in one direction, and a spring adapted to engage the under side of each of said toggle bars and, normally, to yieldingly hold them in engagement with said stop elements.

2. A weed-pulling appliance comprising a tongs having long arms and short legs, a tine-head on each leg of said tongs, a plurality of pointed tines, having inwardly bent lower ends, depending from each of said tine-heads, the tines in one tine-head being staggered with respect to those in the other tine-head, a handle, a toggle-bar-aligning beam to which is attached the lower end of said handle, a toggle mechanism, embodying two toggle bars, their inner ends pivotally secured to and midway the length of said toggle-bar-aligning beam, and their outer ends pivotally joined to the free ends, respectively, of the long arms of said tongs, abutment flanges transversely disposed on the ends, respectively, of said toggle-bar-aligning beam, said flanges serving as stops to horizontally align the two toggle bars when in their normal positions, and means adapted to yieldingly hold said toggle bars in engagement with said stop members.

3. A weed-pulling appliance comprising a handle having an opening therethrough, a tongs, embodying two elements each thereof having a long arm and a short leg, a plurality of pointed tines depending from each of the short legs of said tongs, the pointed ends of the tines in one leg being bent toward the bend ends of the tines in the other leg, two toggle-bars pivotally mounted on the lower end of said handle, the outer ends of said toggle-bars being pivotally connected with the outer ends of the long arms, respectively, of said tongs, an apertured lug on each of said toggle-bars, a rod within said handle, a link connecting each of said apertured lugs with said rod, and a knob on the upper end of said rod constituting means for partially withdrawing said rod from out of said handle, to the end that said short legs of the tongs may be brought toward each other and the tines thereon made to engage, relatively.

4. A weed-pulling appliance having characteristics according to claim 3, and a slip-joint connection on the rod in said handle, intermediate its ends, adapted to permit longitudinal movement of the lower portion of the rod without causing longitudinal movement of the upper portion thereof, in and relative to said handle.

5. A weed-pulling appliance comprising a handle element having a slotted lower end, a toggle-bar aligning beam disposed at the lower end and transversely of said handle element and having at each end an abutment flange, two toggle-bars disposed, one abreast of the other, within the slot in the lower end of said handle element, and having a common pivotal point on said handle, a tongs, embodying two pivotally joined elements each thereof having a long arm and a short leg, the outer ends of the long arms having pivotal connections, respectively, with the outer ends of said toggle-bars, the three pivotal points of said toggle-bars being normally in substantially horizontal alignment, a plurality of pointed tines, the ends of which are bent inwardly, depending from each of said short legs, foot-pads on said tongs so arranged as to permit foot-pressure being applied thereon vertically over said tines, and yieldable means to automatically lift said toggle-bars into their normal, abutment-flange-engaging positions after they have been disaligned by the upward movement of said handle, relative to said tines, incident to pulling a weed and subsequent to the withdrawal of the tines from the ground.

JASON N. PRIDE.